US012721311B2

(12) United States Patent
Dunahoo

(10) Patent No.: US 12,721,311 B2
(45) Date of Patent: Sep. 1, 2026

(54) TEMPERATURE-CONTROLLED BOWL

(71) Applicant: Daryl Dunahoo, Pendergrass, GA (US)

(72) Inventor: Daryl Dunahoo, Pendergrass, GA (US)

( * ) Notice: Subject to any disclaimer, the term of this patent is extended or adjusted under 35 U.S.C. 154(b) by 0 days.

(21) Appl. No.: 19/242,251

(22) Filed: Jun. 18, 2025

(65) Prior Publication Data

US 2025/0386798 A1 Dec. 25, 2025

Related U.S. Application Data

(60) Provisional application No. 63/662,251, filed on Jun. 20, 2024.

(51) Int. Cl.
*A01K 7/02* (2006.01)

(52) U.S. Cl.
CPC .................................... *A01K 7/027* (2013.01)

(58) Field of Classification Search
CPC . A01K 7/00; A01K 7/005; A01K 7/02; A01K 7/022; A01K 7/025; A01K 7/027; A01K 7/028; A01K 7/04; A01K 7/06; A01K 5/01; A01K 5/0108; A01K 5/0114; A01K 5/0201; A01K 5/0287
See application file for complete search history.

(56) References Cited

U.S. PATENT DOCUMENTS 4,561,384 A * 12/1985 Liff ........................ A01K 7/027 219/465.1
5,782,094 A * 7/1998 Freeman ............... A47F 3/0404 62/3.6
7,423,243 B2 * 9/2008 Reusche .............. A01K 1/0158 219/494
11,602,125 B2 * 3/2023 Tompkins ............ A01K 5/0114
2007/0022964 A1 * 2/2007 Reusche ................ A01K 7/027 119/73
2007/0227456 A1 * 10/2007 Borey .................... A01K 7/027 119/61.52
2024/0268342 A1 * 8/2024 Seyfi ....................... F25B 21/04
2024/0415094 A1 * 12/2024 Li ........................ A01K 5/0275

FOREIGN PATENT DOCUMENTS

CN 109997713 A * 7/2019 ............. A01K 7/027
DE 20116085 U1 * 2/2002 ........... A01K 5/0128

* cited by examiner

*Primary Examiner* — Ebony E Evans
(74) *Attorney, Agent, or Firm* — Whitley Legal Group, PC; AnnMarie W Whitley

(57) ABSTRACT

A temperature-controlled bowl for pets and others includes a housing assembly, a cooling system, and a control system. The housing assembly, which includes multiple chambers, supports a bowl insert in its first chamber, which can be cooled or heated through thermal coupling with a thermoelectric module of the cooling system. When energized, the thermoelectric module absorbs heat on its cooling side and radiates heat on its opposite side. The cooling system further includes a conductive block, a heat sink, and a fan, most of which are isolated in a second chamber of the housing that includes a plurality of exhaust vents. A third chamber draws air into it and the fan of cooling system through a plurality of intake vents. Additional optional features include sensors to monitor the temperature of the bowl insert, feet and anti-slip components, timers, and other features for controlling the operation of the bowl.

16 Claims, 16 Drawing Sheets

FIG. 7
22
22b
22a
22c
FIG. 8A
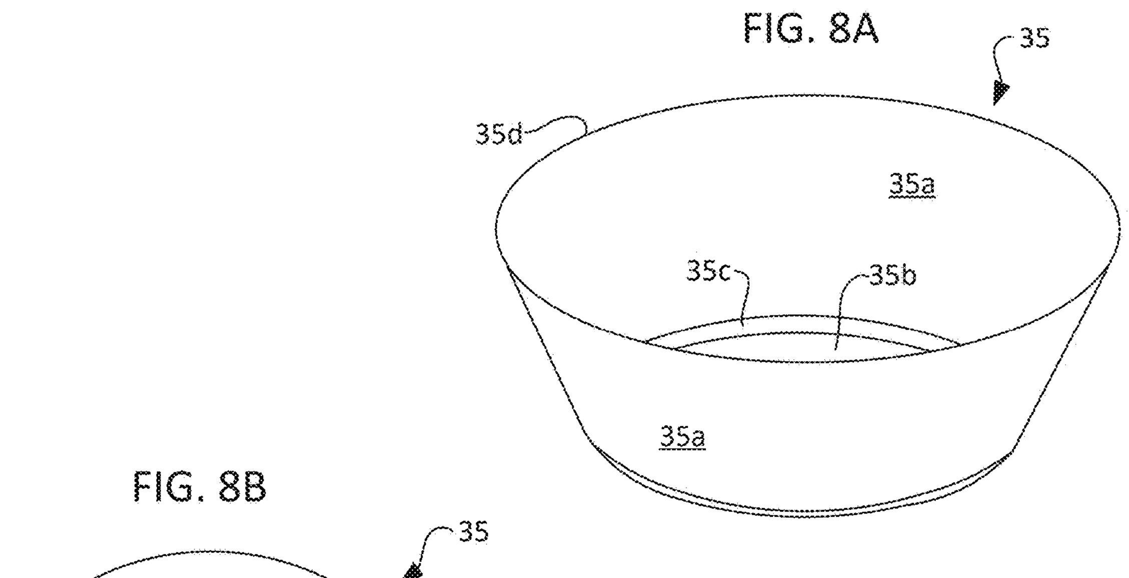
FIG. 8B
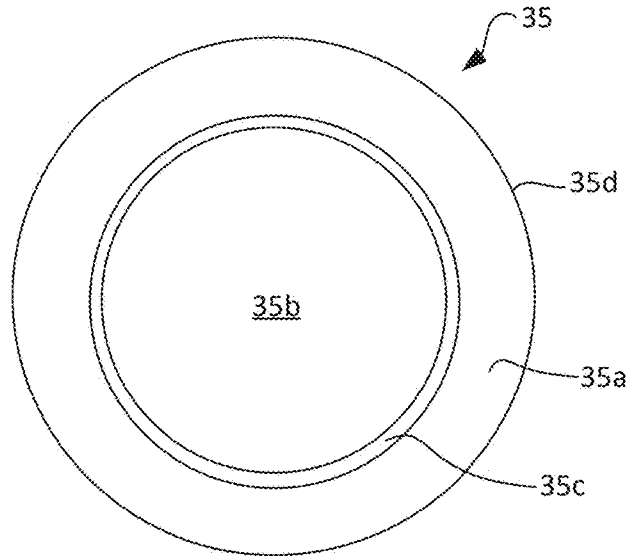

FIG. 9A
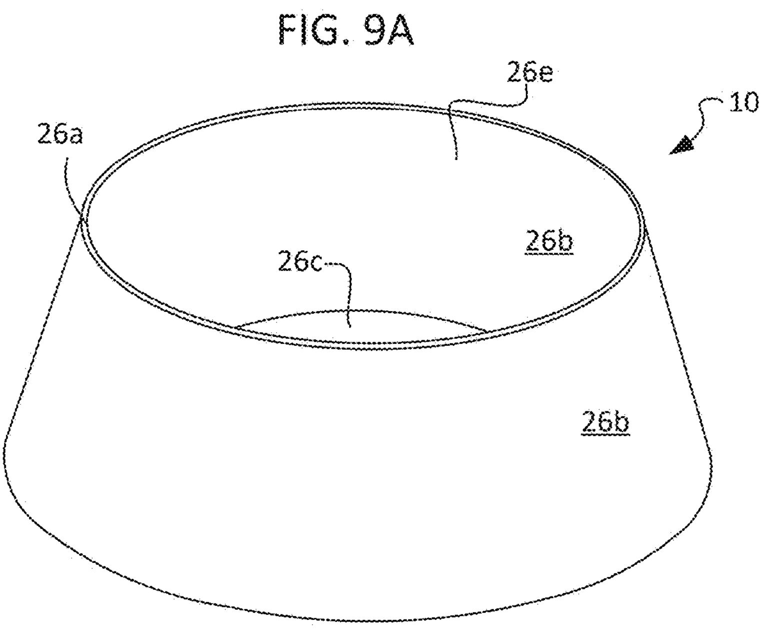
FIG. 9B
FIG. 9C
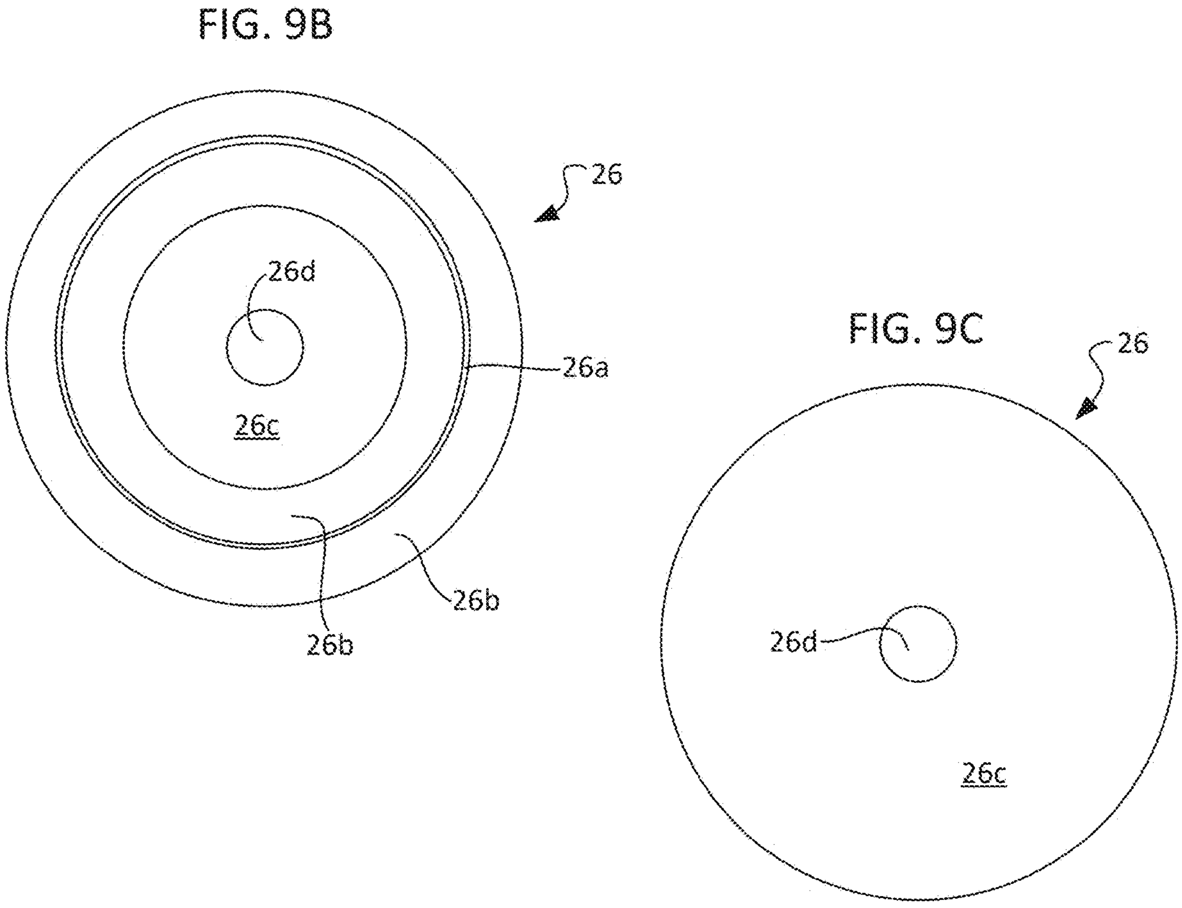

30
32a
30a
30c
30b
32
30a
30c

FIG. 12
90
91
92
94a
94b
FIG. 13A
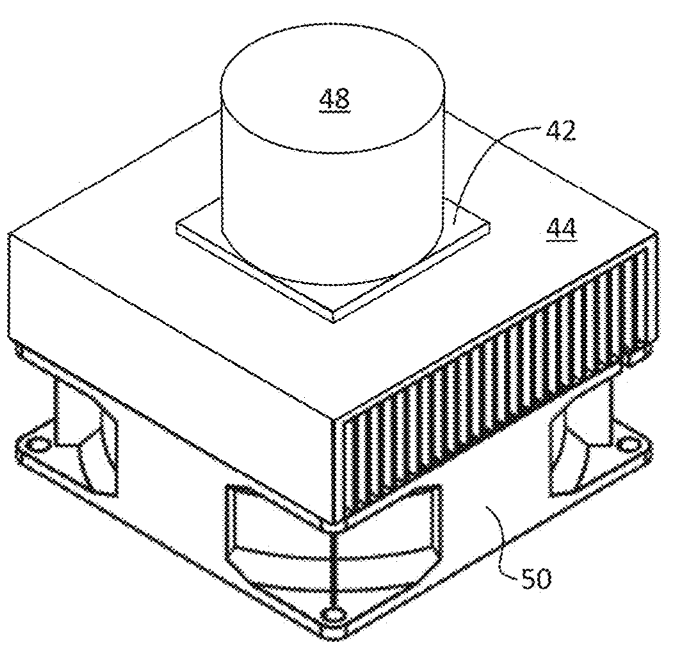
FIG. 13B
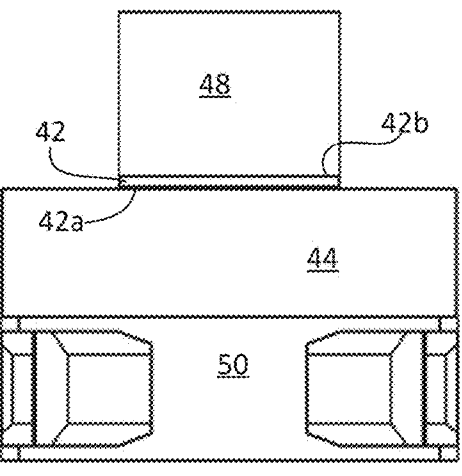

10
85
93
30
48
80
24
17A, 17B
17A, 17B
20
29
85

20
24
26
28
29
30
30a
30b
35
35a
35b
42
44
50
68
75a
85
97
98
110
112
120

42
42a
42b 10
20
24
26
28
30
30a
30b
35
42
44
45
50
68
92
95
96
97
98
99
100
120

10
30
20
28
28
28

10
30
20
130
28
28

10
20
30
140
28
28

10
30
20
28
28
28

10
24
26
30
42
44
50
28
28
20
70
72
74
76
77
78
79
92
96
97
98
99
100
120

TEMPERATURE-CONTROLLED BOWL

CROSS-REFERENCE TO RELATED APPLICATIONS

This application claims the benefit of provisional U.S. application No. 63/662,251 filed Jun. 20, 2024.

FIELD OF THE INVENTION

This invention relates to bowls for holding food and drinks. More particularly, this invention relates to a chilled or heated bowl useful for holding water or food for pets and others.

BACKGROUND OF THE INVENTION

Cool drinking water has benefits for both humans and their pets. For example, many people find cool water tastes better and believe it prevents toxin build up, strengthens one's immune system, accelerates hydration during workouts, and improves one's alertness. Likewise, dogs and other pets have shown a preference for drinking cool water, often opting to drink from cool streams, puddles, and outdoor water dishes. Interestingly, the precise water temperature preferred by dogs appears to vary based on a dog's core body temperature, with those having a lower core body temperature preferring slightly warmer water than those with a warmer core body temperature. For some dogs, water chilled to temperatures around 15 degrees Celsius or 59 degrees Fahrenheit is preferred, while all dogs appear to generally prefer cool water over lukewarm water.

In addition to some pets preferring chilled water, supplying a cool source of water for one's pets has hidden benefits. Temperature is an important factor for microbial growth, and low temperatures usually inhibit or stop microbial growth and proliferation. Accordingly, refrigeration is commonly used in the food, pharmaceuticals, and biotechnology industry. Given that pet owners typically keep water available for their pets during most or all of the day, water kept in traditional water bowls tends to warm up to the ambient temperature regardless of how cold the water was when it first filled the bowl. It is not uncommon for a pet's water bowl to settle at temperatures between 70 and 80 degrees, temperatures at which many microbes flourish.

Given that pets often prefer chilled water and that low temperature water is less likely to promote microbial growth, many pet owners choose water bowls that advertise features designed to keep water cooler and fresher. Currently available cooling-type water bowls include triple wall insulated stainless steel water bowls, water bowls that house freezable inserts, and freezable bowls made of plastic and filled with freezable gel or cooling crystals. Unfortunately, the currently available cooling bowls only offer short-term benefits, fail to maintain a consistent, reliable chilled temperature, and lack the ability to control and adjust the water's temperature.

In light of the lack of choices available to pet owners, it would be desirable to provide a temperature-controlled bowl for pets that chills water for an indefinite or long period of time and offers reliability and consistency. It would be further desirable to provide a customizable temperature-controlled bowl for pets, one where the temperature can be fine-tuned and controlled by a pet owner. It would also be desirable to provide a bowl that can also be heated should a pet or pet owner need the bowl contents to be warmed or kept warm.

SUMMARY OF THE INVENTION

A temperature-controlled bowl includes a housing assembly with a bowl insert, which can be cooled, chilled, or optionally warmed using a control system and a cooling system with a thermoelectric module such as a Peltier module. The temperature-controlled bowl is useful for holding a pet's water and maintaining it at a consistent cool temperature as well as for holding other foods and liquids that are best chilled such as salads or punches for humans. Alternatively, the bowl can be warmed to defrost items or maintain food and drinks such as soup or cider at a higher temperature.

The thermoelectric module of the temperature-controlled bowl's cooling system preferably has a first side that radiates heat when energized and second side that absorbs heat and becomes cold when energized, the second side being directed at and positioned adjacent, near, or directly or indirectly thermally coupled to the bowl insert. Optionally, where it is desired to have the temperature-controlled bowl both heat and cool its contents, the polarity of the thermoelectric module can be reversed so that the first side absorbs heat, and the second side radiates heat when energized. Whether heating or cooling, the second side of the thermoelectric module thermally couples to the bowl insert, optionally via a conduction block that is part of the cooling system and a liner that is part of the housing assembly, both of which are situated between the bowl insert and thermoelectric module, and the bowl insert is thereby cooled or warmed by the second side of the thermoelectric module. In its preferred embodiment, the first side of thermoelectric module preferably cooperates with one or more heat sinks to transfer heat away from the bowl insert, and one or more fans located nearby within the housing, which further improve heat transfer away from the bowl insert. Together, the conductive block, thermoelectric module, heat sink, and fan comprise the cooling system of the temperature-controlled bowl.

Preferably, a control system electrically and operationally connects a power source to the cooling system and, specifically, to the thermoelectric module and first fan. The control system further includes an optional polarity reversal switch, optional controller or computer system, optional display, and inputs or switches such as a rheostat switch for controlling the temperature. The control system is preferably at least partially positioned in the housing of the housing assembly, and the optional display and input or switch are preferably at least partially positioned on or in the housing.

The housing assembly preferably also includes a liner or trough that supports the bowl insert, the liner having a shape that mimics the bowl insert's shape. The bowl insert preferably includes a wall and a base, and the liner also preferably includes a wall and a base. Additionally, the housing assembly preferably houses insulation that partly or wholly surrounds the walls of the liner and the bowl insert, and the housing assembly preferably includes a protective cap that sits between the rim of the bowl insert and the top surface or lip of the housing. Also preferably, the housing includes partitions to support elements of the cooling system and to isolate air movement within individual sections of the housing and cooperating first and second pluralities of vents, which facilitate air flow through housing to improve the function of the cooling system.

In the preferred embodiment, temperature-controlled bowl has an appearance like popular pet dishes with a wide base and smaller upper surface or rim where the bowl insert sits. The overall shape of both the housing and bowl insert, however, can be almost any shape or size provided the bowl insert can hold water, the housing can support the bowl insert and accommodate the components needed to facilitate chilling the bowl insert, and the overall temperature-controlled bowl is sized for a pet's use.

In addition to the preferred embodiment, alternate embodiments may include additional features useful for improving cooling or warming of the bowl, for further enhancing the taste or freshness of the water, or for improving the pet or pet owner's overall experience with the temperature-controlled bowl. For example, an alternate embodiment of the temperature-controlled bowl includes optional additional thermoelectric modules thermally coupled to the bowl trough or liner to enhance or aid in cooling, chilling, or heating the bowl insert. Temperature-controlled bowl also may include additional fans to increase or improve airflow within the housing. Another alternate embodiment of the temperature-controlled bowl includes optional water filtration and fountain features. Other embodiments may include multiple displays or indicators, interchangeable housings or housing skins, or one or more access ports for accessing the temperature-controlled bowl components should they need servicing or replacement.

To use the temperature-controlled bowl for a pet, a pet owner or caregiver fills the bowl insert with water or food and, where the bowl insert can be removed from the housing, places the filled bowl insert into the liner of the housing assembly. After the bowl insert has been filled with water or food and secured in the housing, the pet owner or caregiver connects the temperature-controlled bowl to a power source and, where necessary, switches the power on. Using the rheostat switch or the optional display, the pet owner or caregiver can set a temperature and, in some embodiments, set a cooling or warming schedule or other temperature-controlling features. According to the selected settings, the thermoelectric module operates to chill or warm the bowl insert and, once a desired temperature has been reached, operates intermittently to maintain the specified temperature. At any time while the bowl insert is present in the housing, a pet can approach the temperature-controlled bowl and drink or eat from it. When the bowl is empty, optionally a signal alerts the pet owner or caregiver, and the temperature-controlled bowl can be manually or automatically disconnected from the power source for refilling.

BRIEF DESCRIPTION OF DRAWINGS

FIG. 7 is a perspective view of the cap of the temperature-controlled bowl of the present invention according to the preferred embodiment.

FIG. 8A is a perspective view of the liner of the temperature-controlled bowl of the present invention according to the preferred embodiment.

FIG. 8B is a top view of the liner of the temperature-controlled bowl of the present invention according to the preferred embodiment.

FIG. 9A is a perspective view of the insulation of the temperature-controlled bowl of the present invention according to the preferred embodiment.

FIG. 9B is a top view of the insulation of the temperature-controlled bowl of the present invention according to the preferred embodiment.

FIG. 9C is a bottom view of the liner of the temperature-controlled bowl of the present invention according to the preferred embodiment.

FIG. 12 is a perspective view of some of the components of the control system of temperature-controlled bowl of the present invention according to the preferred embodiment.

FIG. 13A is a perspective view of some components of the cooling system of temperature-controlled bowl of the present invention according to the preferred embodiment.

FIG. 13B is a side view of the components of the cooling system of temperature-controlled bowl of the present invention according to the preferred embodiment.

Figure 1:
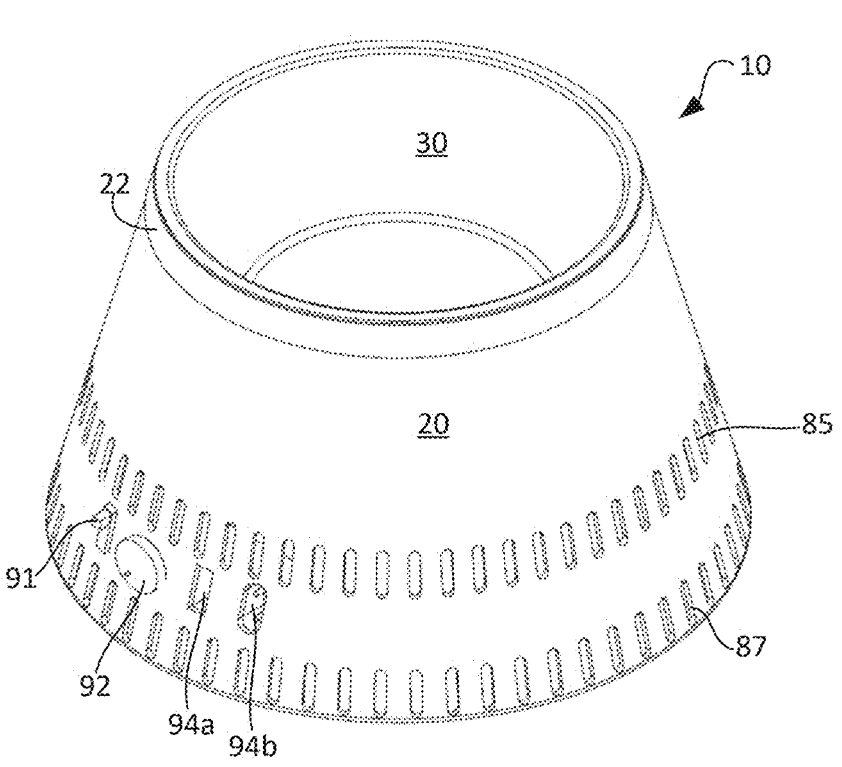
FIG. 1 is a perspective view of the temperature-controlled bowl of the present invention according to the preferred embodiment.
Figure 2:
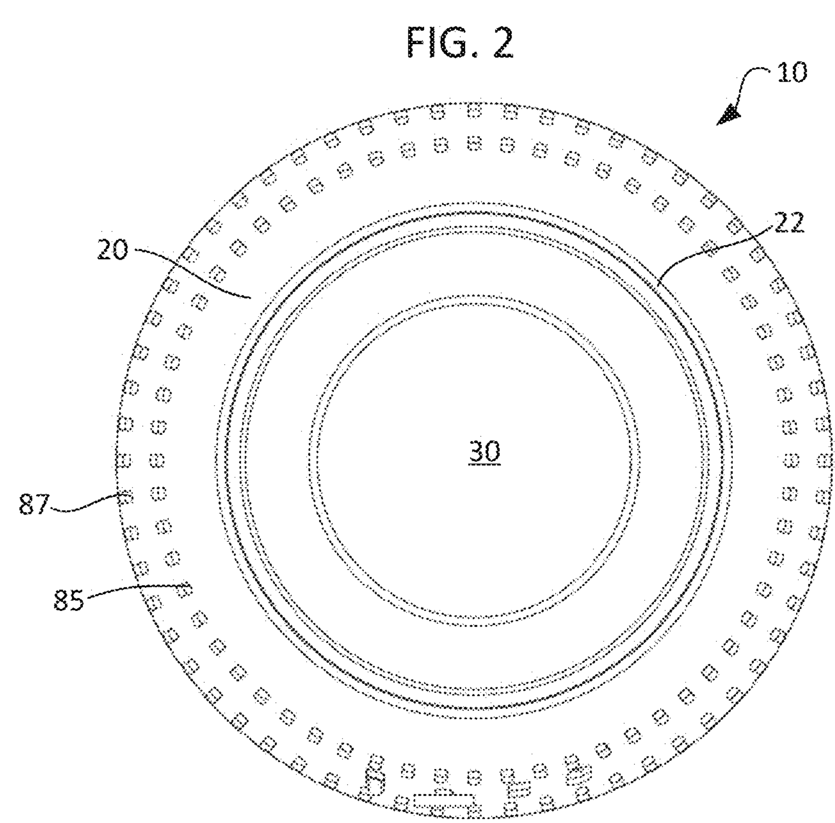
FIG. 2 is a top view of the temperature-controlled bowl of the present invention according to the preferred embodiment.
Figure 3:
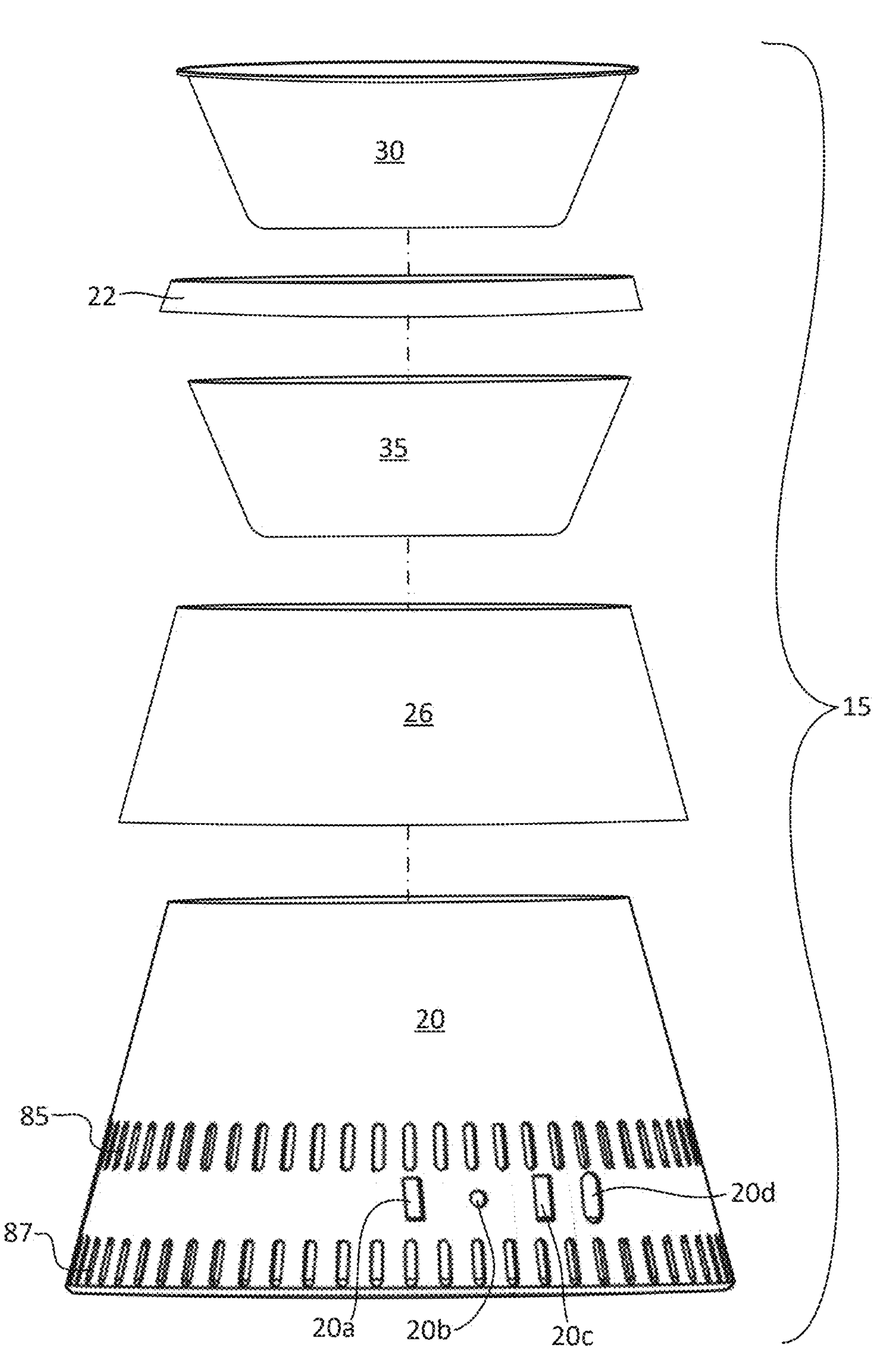
FIG. 3 is an exploded view of the housing assembly of the temperature-controlled bowl of the present invention according to the preferred embodiment.
Figure 4:
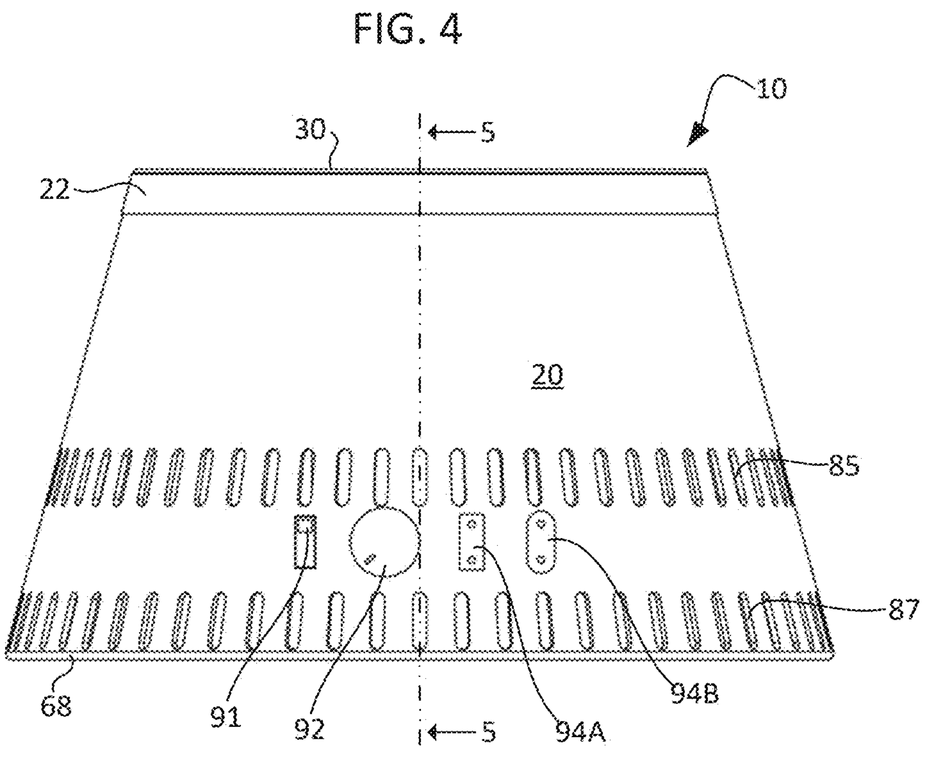
FIG. 4 is a side view of the temperature-controlled bowl of the present invention according to the preferred embodiment.

For a better understanding of the invention reference is made to the following detailed description of the preferred embodiments of the invention which should be taken in conjunction with the above-described drawings.

DETAILED DESCRIPTION OF THE INVENTION

A temperature-controlled bowl 10 for pets includes a housing assembly 15, a cooling system 40, and a control system 90 as shown in FIGS. 1-24. Housing assembly 15 generally includes a housing 20 that supports a bowl insert 30, which can be cooled or heated using a thermoelectric module 42 having a first side 42*a* that preferably radiates heat when energized and a second side 42*b* that preferably absorbs heat and becomes cold when energized. Thermoelectric module 42, which is part of cooling system 40, can be a Peltier module, which is known to those skilled in the art of refrigeration. Control system 40 operates to energize and control the thermoelectric module 42 of cooling system 90 and optionally to monitor the temperature of bowl insert 30. Additional details about housing assembly 15, cooling system 40, and control system 40 follow.

Figures 17A, 17B:
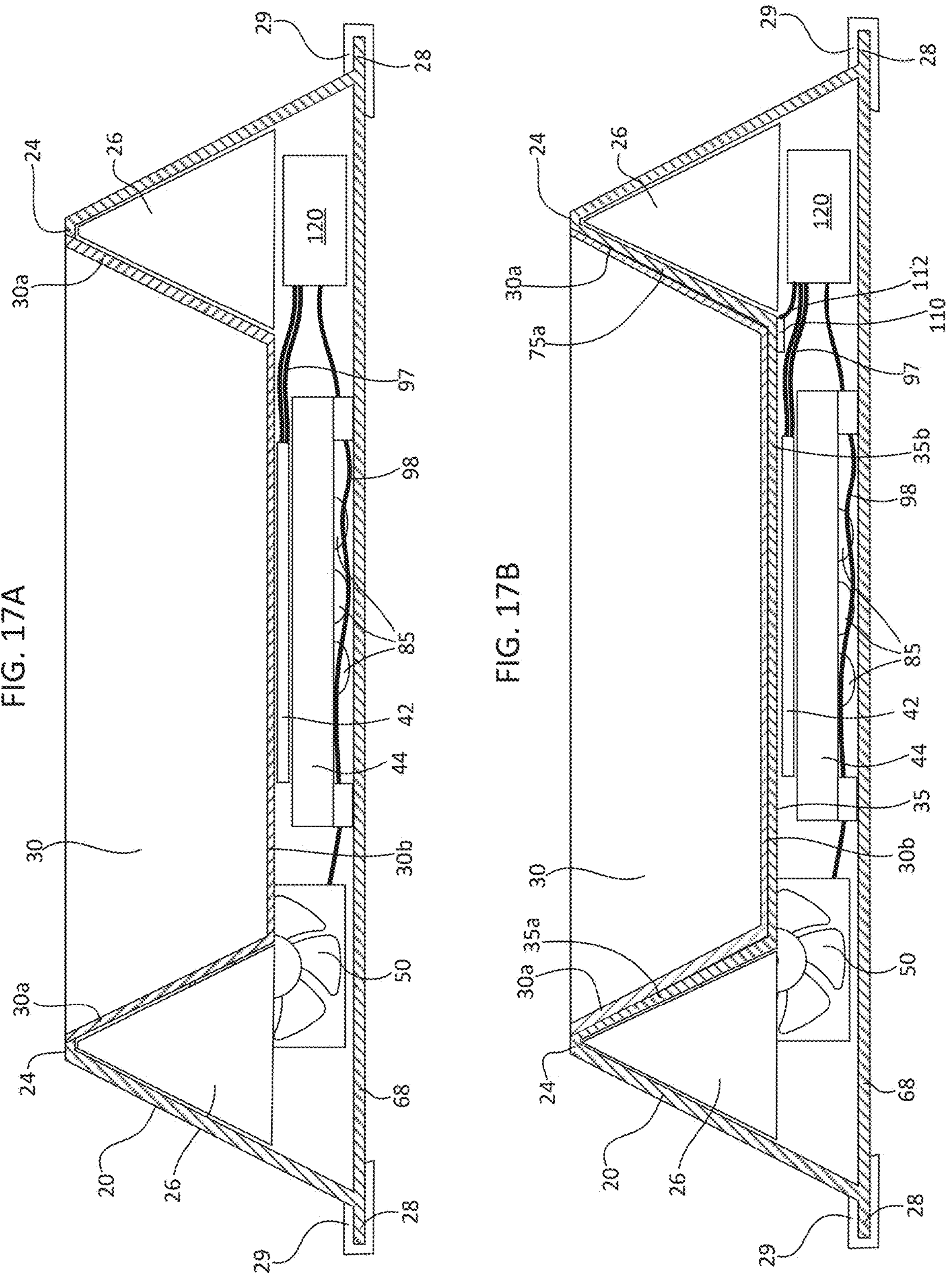
FIG. 17A is a view of the temperature-controlled bowl shown in FIG. 15 cut along the line 17A, 17B-17A, 17B with a shallow flange for supporting the bowl insert.
FIG. 17B is a view of the temperature-controlled bowl shown in FIG. 15 cut along the line 17A, 17B-17A, 17B with a trough for supporting the bowl insert.
Figures 18, 19:
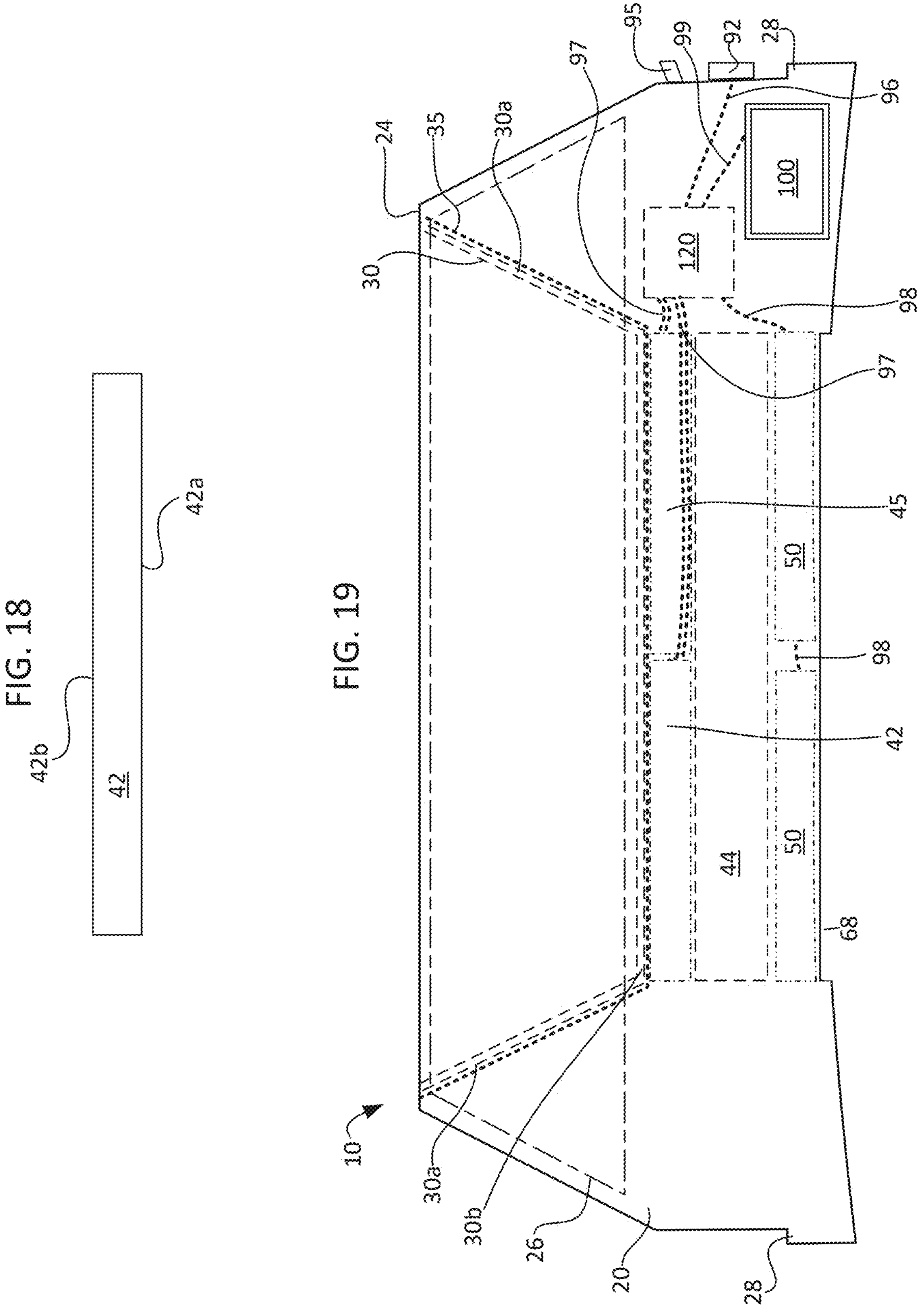
FIG. 18 is a side view of the thermoelectric module of the preferred embodiment of the present invention.
FIG. 19 is a side view of a third alternative embodiment of the temperature-controlled bowl of the present invention.
Figure 23:
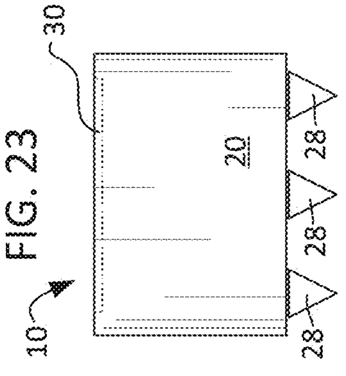
FIG. 23 is a side view of a fourth alternative embodiment of the housing and bowl insert of the temperature-controlled bowl of the present invention.
Figure 21:
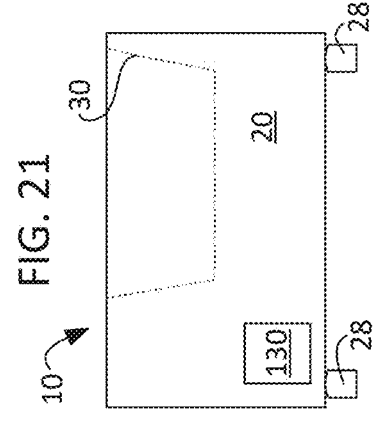
FIG. 21 is a side view of a second alternative embodiment of the housing and bowl insert of the temperature-controlled bowl of the present invention.
Figure 20:
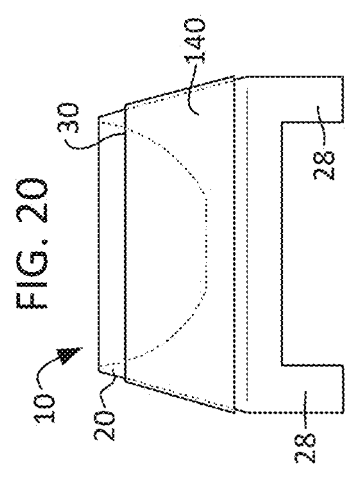
FIG. 20 is a side view of an alternative embodiment of the housing and bowl insert of the temperature-controlled bowl of the present invention.
Figure 22:
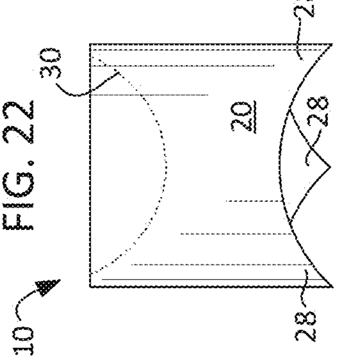
FIG. 22 is a side view of a third alternative embodiment of the housing and bowl insert of the temperature-controlled bowl of the present invention.
Figure 24:
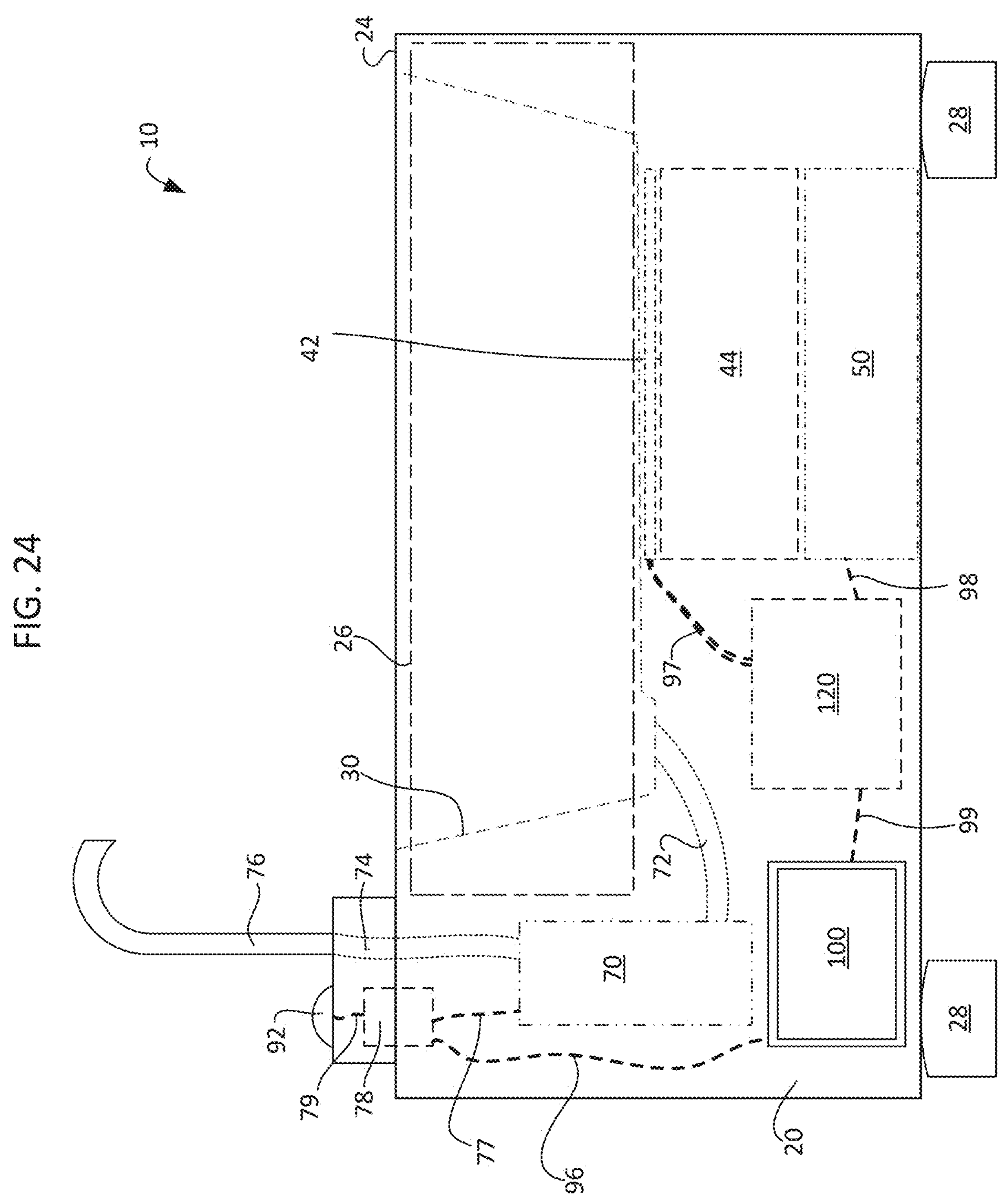
FIG. 24 is a side view of a fourth alternative embodiment of the temperature-controlled bowl of the present invention with an optional fountain.

FIGS. 1-10B, 14-17B, and 19-24 illustrate the components and configuration of several embodiments of housing assembly 15. In its preferred embodiment, housing assembly 15 includes housing 20, bowl insert 30, a liner 35 that serves as the receptacle for and interface between bowl insert 30 and housing 20, insulation 26 that is positioned within housing 20 such that it partly or wholly surrounds liner 35 and bowl insert 30, and an optional but preferred protective cap 22 that rests on an upper surface or support lip 24 of housing 20. Generally, the components of housing assembly 15 can come in a variety of shapes and sizes depending on the intended use of temperature-controlled bowl 10, design preferences of the customer, and the size of the pet when bowl 10 is used for pets. FIGS. 1-10B illustrate the size and shape of housing assembly 15 and its individual components according to the preferred embodiment, and FIGS. 14-17B illustrate an embodiment of housing assembly 15 where housing 20 and bowl insert 30 have a standard pet dish shape and size. FIG. 19 illustrates an embodiment of housing assembly 15 having a taller housing 20, and FIGS. 20-23 show examples of additional embodiments of housing assembly 15 having a variety of sizes and shapes. FIG. 24 illustrates an embodiment of bowl 10 and housing assembly 15 further incorporating an optional filter 70 and fountain 76. While bowl 10 is described herein with reference to a water dish for pets, it shall be understood that bowl 10 can also be used to hold food for pets, food or drinks for people, or any substance or item that can be kept in a bowl.

Housing 20 of bowl 10 preferably is made of a durable material with high thermal resistance such as polypropylene, polyethylene, and other plastics. Housing 20 is preferably substantially hollow, having a housing wall 60, a housing floor 68, and a lip or upper surface 24. Upper surface 24 can be the edge of housing wall 60 or a shallow flange as shown in FIGS. 5-6D and 14-17A, an extended flange to support more of bowl insert 30, or a fully integrated liner 35 as shown in FIG. 17B. Upper surface 24 can also be any configuration of support tabs, ribs, flanges, gaskets, extensions, or the like that are suitable for supporting a separate liner 35 and bowl insert 30 as will be understood by those skilled in the art. Likewise, housing wall 60 can be a sloped, continuous perimeter wall having a circular shape as preferred and shown in FIGS. 5-6D, or it can be made of multiple sub-walls that abut each other or are attached together such that the perimeter takes on alternate shapes such as star shape, square, rectangular, oval, or an irregular shape. Additionally, housing wall 60 need not be sloped and can instead be, for example, vertical or feature fanciful angles and designs. Floor 68 can also vary in size, shape, elevation, and design features.

Figure 5:
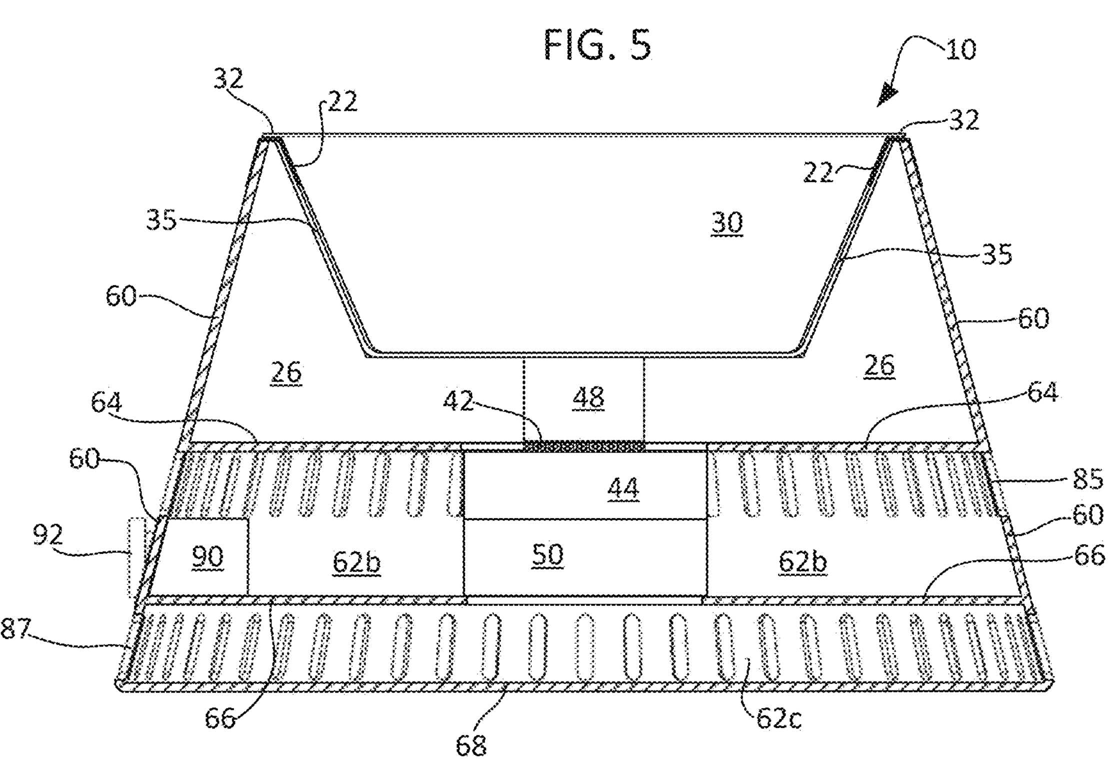
FIG. 5 is a view of the preferred embodiment of the temperature-controlled bowl shown in FIG. 4 cut along the line 5-5.
Figure 6A:
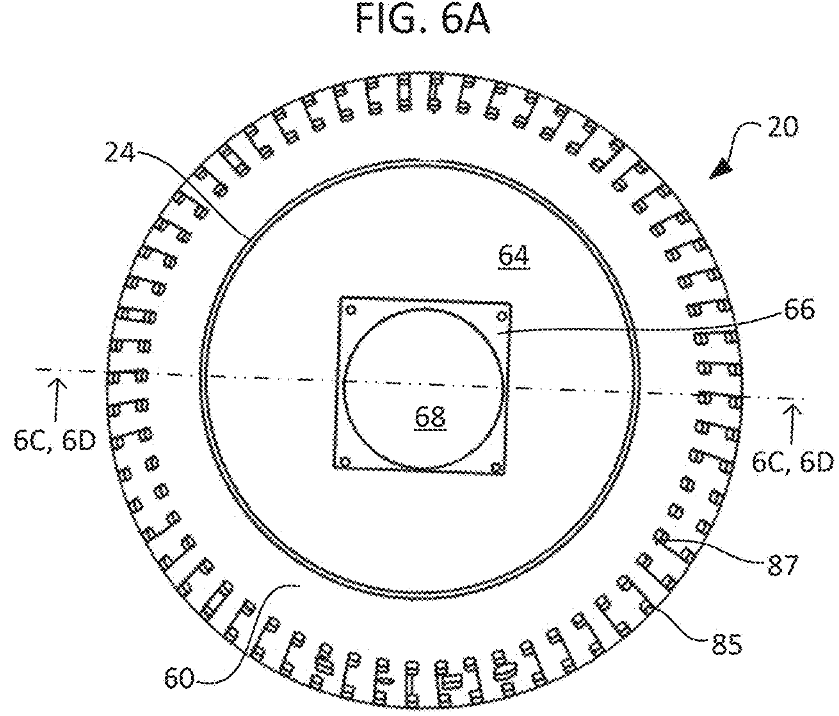
FIG. 6A is top view of the housing of the temperature-controlled bowl of the present invention according to the preferred embodiment.
Figure 6B:
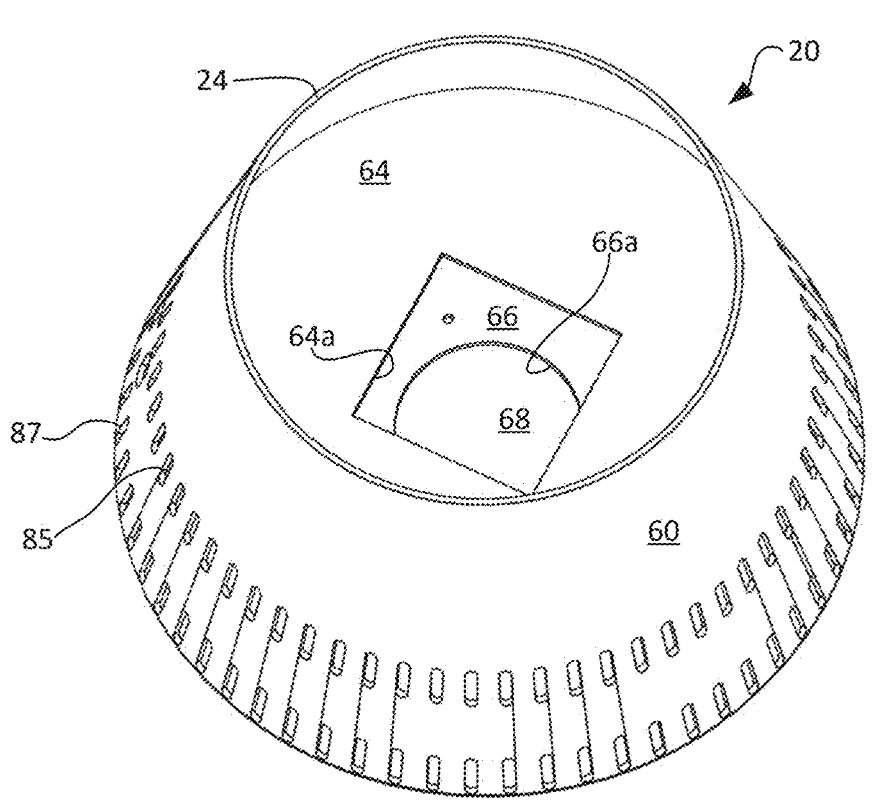
FIG. 6B is a perspective view of the housing of the temperature-controlled bowl of the present invention according to the preferred embodiment.
Figure 6C:
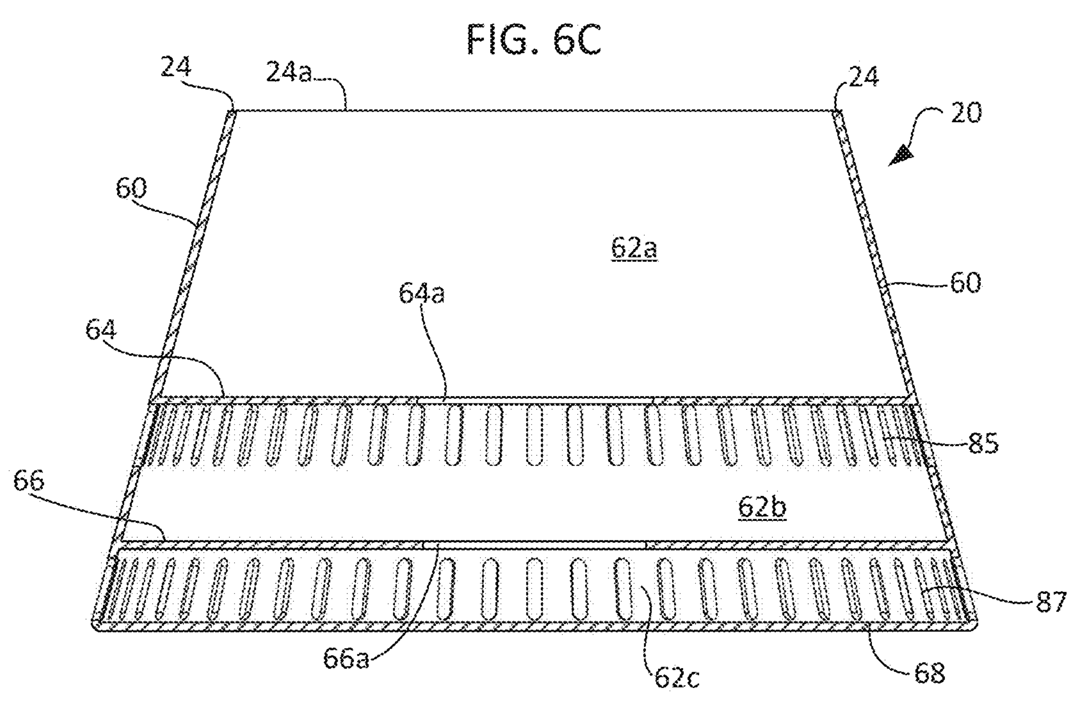
FIG. 6C is a first view of housing of the temperature-controlled bowl shown in FIG. 4 cut along the line 6C, 6D-6C, 6D.
Figure 6D:
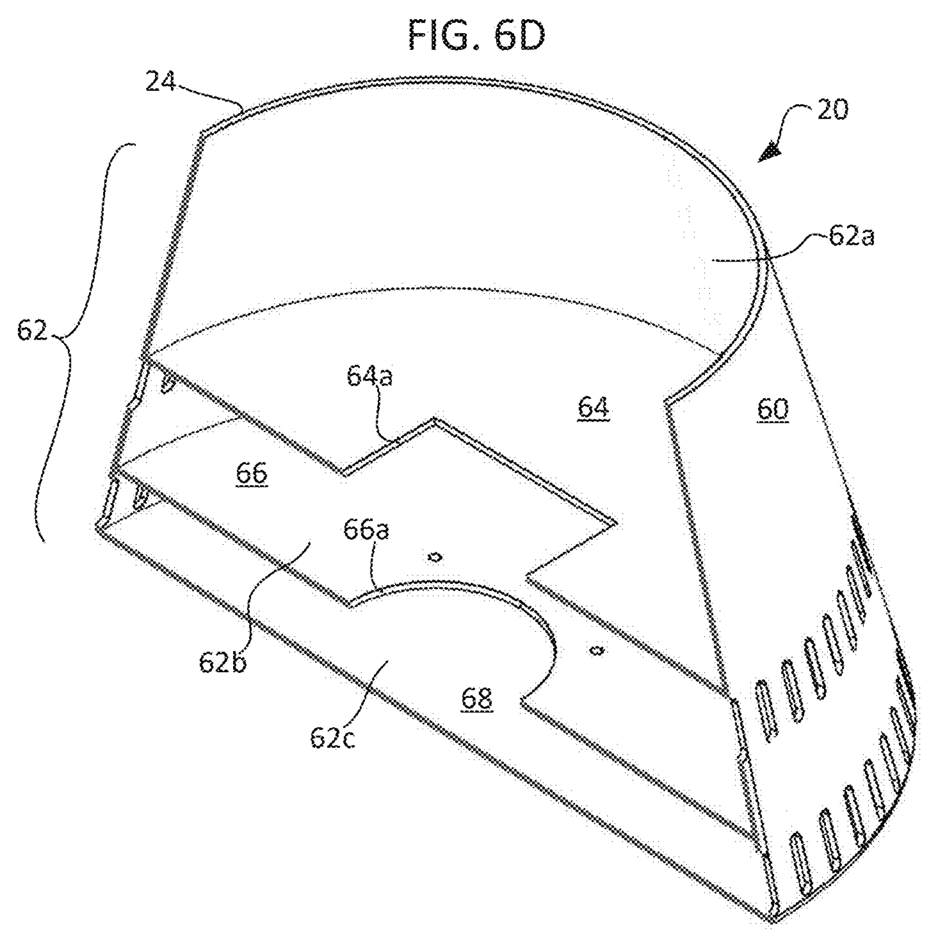
FIG. 6D is a second view of housing of the temperature-controlled bowl shown in FIG. 4 cut along the line 6C, 6D-6C, 6D.
Figures 10A, 10B:
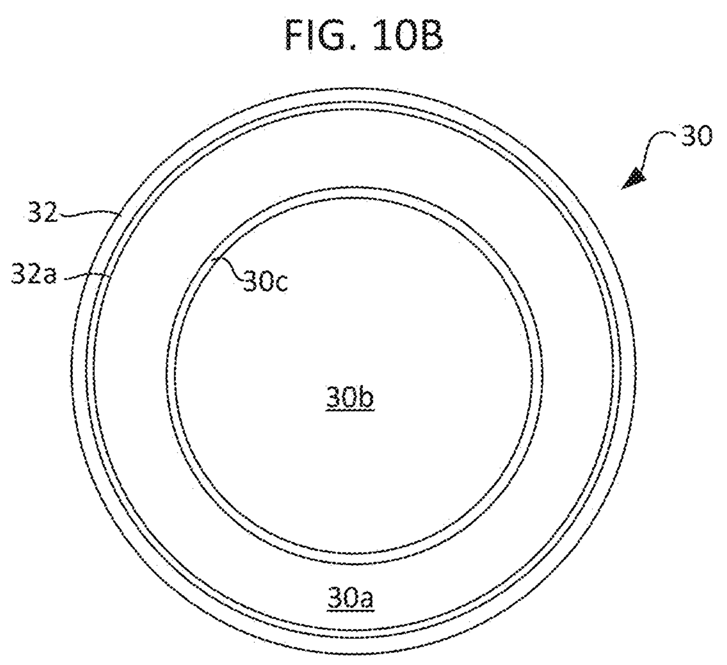
FIG. 10A is a perspective view of the bowl insert of the temperature-controlled bowl of the present invention according to the preferred embodiment.
FIG. 10B is a top view of the bowl insert of the temperature-controlled bowl of the present invention according to the preferred embodiment.

Preferably, upper surface 24 of housing 20 further defines an opening 24*a* for receiving liner 35 and bowl insert 30, and together housing wall 60, floor 68 and upper surface 24 surround and define a housing chamber 62 that can be one large chamber or divided into multiple sub-chambers. Preferably, housing 20 includes a first partition 64 and a second partition 66 that divides chamber 62 into three sub-chambers 62*a*, 62*b*, and 62*c* that are in fluid communication with each other through a first partition opening 64*a* defined by first partition 64 and a second partition opening 66*a* defined by second partition 66. FIGS. 5-6D illustrate sub-chambers 62*a*, 62*b*, and 62*c* that make up chamber 62. As shown, first sub-chamber 62*a* is surrounded by housing wall 60, first partition 64, and liner 35 when present, second sub-chamber 62*b* is surrounded by housing wall 60, first partition 64 and second partition 66, and third sub-chamber 62*c* is surrounded by housing wall 60, second partition 66, and housing floor 68. Optionally, additional partitions and sub-chambers may be present to direct airflow through housing 20 or second and third sub-chambers 62*b* and 62*c* can be positioned adjacent to one another rather than vertically stacked as shown in FIGS. 5-6D Housing assembly 15 preferably also includes one or more openings 20*a*, 20*b*, 20*c*, and 20*d* defined by housing 20 and positioned on housing wall 60 to accommodate controls, switches, and receptacles of control system 90 and one or more feet, legs, or lower supports 28 that connect to housing 20 at or near housing floor 68 or one or more lower supports 28 that are integrally connected to housing 20 or its floor 28. Moreover, with some embodiments, lower support 28 may further be extensions of housing wall 60 or housing floor 68. For example, lower support 28 can be a plurality of feet as shown in multiple figures, a continuous rim as shown in FIG. 14-17B, one or more risers as shown in FIG. 19, or other features designed to support temperature-controlled bowl 10 when in use. Preferably, lower supports 28 are made of the same material as housing 20, but complimentary or contrasting materials can be used as long as they are sufficiently strong enough to support bowl 10. Lower supports 28 can further be adjustable or include additional features such as a rubber or silicone patches or an anti-slip ring 29 as shown in FIGS. 14-17B. In the preferred embodiment, housing assembly 15 includes three lower supports 28.

Preferably, housing 20 also includes a first plurality of vents 85 defined by housing wall 60 or floor 68 to improve airflow within housing 20 where the plurality of vents 85 are configured and arranged such they enable fluid communication between chamber 62 of housing 20 and the space or environment surrounding bowl 10. Preferably first plurality of vents 85 includes multiple openings spaced at regular intervals around the perimeter of housing wall 60 as shown in FIGS. 1-6D. More preferably, the openings of first plurality of vents 85 are exhaust vents and positioned such that they enable fluid communication between second sub-chamber 62*b* of housing 20 and the surrounding environment. Additionally, the preferred embodiment includes a second plurality of vents 87, which also include multiple openings preferably spaced at regular intervals around the perimeter of housing wall 60 of housing 20, where the openings are arranged and configured such that they enable fluid communication between chamber 62 and the space or environment surrounding bowl 10. More preferably, the openings of second plurality of vents 87 are air intake vents and positioned such that they enable fluid communication between third sub-chamber 62*c* of housing 20 and the surrounding environment. FIGS. 1-6C illustrate the preferred configuration and placement of first and second pluralities of vents 85, 87. Alternatively, either or both of first and second pluralities of vents 85, 87 can be positioned about and defined by housing floor 68 or comprise a large opening in housing floor as shown in FIG. 5. Either or both of first and second plurality of vents 85, 87 can further include groups of openings or individual openings spaced irregularly or regularly around housing 20 as shown in FIGS. 15-17B.

While housing 20 is preferably shaped like popular pet dishes with a wide base and sloped housing wall 60 as shown in FIGS. 1-10B and 14-17B, housing 20 can be any size and shape that supports bowl insert 30 and houses the components discussed herein. For example, housing 20 can be rectangular in shape, domed, generally bowl-shaped, or shallow such that bowl insert 30 is shaped like a plate or platter. Housing 20 can likewise have two or more decorative feet lower supports 28, a wide rim lower support 28, a riser or pedestal lower support 28, or a variety of other decorative yet supportive features that elevate or support housing 20. Preferably, housing 20 has three feet or leg-type lower supports 28 and is sized to accommodate a wide variety of pets of different sizes and heights. Optionally, housing 20 has an adjustable height. Other embodiments interchangeable housings or housing skins 140, or one or more access ports 130 for accessing bowl 10 cooling system 40 and control system 90 components should they need servicing or replacement. Examples of some of the many additional shapes appropriate for housing 20 are shown in FIGS. 20-23.

Housing assembly 15 further includes insulation 26 configured to fit within chamber 62 of housing 20 and more preferably to fit within first chamber 62*a* of housing 20 according to the preferred embodiment and as shown in FIGS. 3, 5, and 9A-9C. Insulation 26 is preferably a material such as polystyrene and configured such that it fills the space in chamber 62 or in first sub-chamber 62*a* between housing wall 60 and liner 35 when housing assembly 15 is assembled. Where no liner 35 is present, insulation 26 is configured such that it fills the space in chamber 62 or in first sub-chamber 62*a* between housing wall 60 and bowl insert 30 when housing assembly 15 is assembled. FIGS. 9A-9C illustrate the preferred shape and configuration of insulation 26 for use in first sub-chamber 62*a* of housing 20. As shown, insulation 26 includes an upper surface 26*a*, wall 26*b*, base 26*c*, opening 26*d*, and cavity 26*e*. Insulation upper surface 26*a* can be an edge that defines the upper perimeter of cavity 26*e*, which is further defined insulation side 26*b* and insulation base 26*c*. Cavity 26*e* preferably appears bowl-shaped and more preferably mirrors the shape of bowl insert 30 such that it cooperates with and receives liner 35 and bowl insert 30. Insulation wall 26*b* is preferably a continuous circular perimeter wall or support and is further preferably integrally connected with insulation base 26*c* as shown in FIGS. 9A-9C. Alternatively, insulation wall 26*b* can be multiple sections that join or abut with each other to form a continuous perimeter wall or that are positioned with spaces between them. Additionally, insulation wall 26*b* can be integrally connected to insulation base 26*c* or it can abut, join, or merely rest upon insulation base 26*c*. Insulation base 26*c* preferably defines opening 26*d*, which is preferably sized and configured to facilitation fluid communication between insulation cavity 26*e* and second sub-chamber 62*b* of housing 20. More preferably, opening 26*d* is configured and sized to accommodate the conduction block 48 of cooling system 40 as shown in the figures and to facilitate a thermal connection between the thermoelectric module 42 of cooling system 40 and liner 35 and bowl insert 30.

Liner 35 of housing assembly 15 can be a trough, liner, skin, mesh, skeleton, or other structure capable of supporting bowl insert 30 when placed in housing 20, preferably through the opening 24*a* of upper surface 24 of housing 20. As shown in FIGS. 1-5 and 8A-8B, the preferred embodiment of liner 35 includes a liner wall 35*a* integrally connected with a base 35*b*, the liner wall preferably having a continuous circular shape that slopes from a larger diameter top edge 35*d* to a smaller diameter liner base 35*b* as shown in the figures. Optionally and preferably, liner 35 further includes a bevel edge 35*c* at the connection between wall 35*a* and base 35*b*. Base 35*b* of liner 35 preferably attaches to and rests on base 26*c* of insulation 26, and wall 35*a* of liner 35 preferably rests on wall 26*b* of insulation 26. Preferably, liner 25 attaches to insulation 26 with fasteners and optionally it attaches with adhesive, a press fit, or some combination thereof. Optionally, liner 35 attaches directly to housing 20 near upper surface 24 of housing 20 and rests at a spaced distance from insulation 26. Preferably, liner 35 is made of a material that is thermally conductive such as aluminum so that its temperature increases or decreases when thermoelectric module 42 of cooling system 40 is energized either through a direct connection with thermoelectric module 42 or an intermediary such as conduction block 48. For example, when second side 42*b* of thermoelectric module 42 radiates heat, the temperature of liner 35 increases, and when second side 42*b* of thermoelectric module 42 absorbs heat, the temperature of liner 35 decreases.

In the preferred embodiment of housing assembly 15, an optional cap 22 is configured to cooperate with the upper surface 24 and the outer surface of housing wall 60 of housing 20, the upper surface 26*a* of insulation 26, and a portion of the wall 35*a* of liner 25 as shown in FIGS. 1-5 and 7. Cap 22 is preferably made of a durable and waterproof or water-resistant material with high thermal resistance such as polypropylene, polyethylene, and other plastics and more preferably is made of the same material as housing 20. Cap 22 serves as protection for cooperating components of housing assembly 15, as a means for securing several housing assembly 15 components together including housing 20, insulation 26, and liner 35, and as a barrier to prevent liquid from splashing or leaking into housing 20. As shown in FIG. 7, cap 22 preferably includes an upper surface 22*a*, an outer flange 22*b*, and an inner flange 22*c*, all of which are integrally connected. Preferably upper surface 22*a* of cap 22 is configured to rest on and protect upper surfaces 24, 26*a* of housing and insulation, respectively. Outer flange 22*b* is configured to rest upon and protect housing wall 60, and inner flange 22*c* is configured to rest upon the wall 25*a* of liner 35. In an alternate embodiment, outer flange 22*b* is configured to fit over insulation 26 but within housing 20 and housing wall 60. Cap can be fastened or adhered to its cooperating components and is preferably attached with fasteners.

In the preferred embodiment of housing assembly 15, bowl insert 30 preferably has a continuous bowl wall 30*a*, a continuous upper lip 32, and a base 30*b* as shown in FIGS. 1-5 and 10A-10B. Bowl wall 30*a* preferably has a continuous circular shape that slopes from a larger diameter at upper lip 32 to a smaller diameter at bowl base 30*b* as shown in the figures. Preferably upper lip 32 and bowl wall 30 are integrally connected, and bowl wall 30*a* and base 30*b* are integrally connected. Bowl insert 30 further preferably includes an optional bevel 30*c* at the connection between bowl wall 30*a* and bowl base 30*b*. Optionally an additional bevel (not labeled) can be present at the connection between bowl wall 30*a* and lip 32. As shown, bowl insert 30 is preferably configured with a similar shape to liner 35 such that it rests on liner 35 when housing assembly 15 is assembled. Specifically, bowl wall 30*a* is configured to rest on wall 35*a* of liner 35 and base 30*b* of bowl insert 30 is configured to rest on base 35*b* of liner 35. Additionally bevel 30*c* of bowl insert 30 is configured to rest on bevel 35*c* of liner 35. To ensure a secure fit, bowl insert 30 is sized slightly smaller than liner 35 as shown in FIGS. 1-5, making ample contact with liner 35 when assembled. Accordingly, bowl insert 30 and its content cool as liner 35 cools, and the fit facilitates thermal coupling with second side 42*b* of thermoelectric module 42 through conduction block 48.

While both bowl insert 30 and liner 35 are described having a continuous circular and sloped perimeter wall attached to a base, both bowl insert 30 and liner 35 can have other shapes as long as they are capable of acting like a bowl and preferably are configured such that they at least partly abut each other when housing assembly 15 is assembled. It shall be understood that bowl insert 30 and complimentary liner 35 can take on a variety of other shapes including those with gentle curves, sharp angles, sloped sides, irregular perimeters, bases, or walls, or unique patterns as will be understood by those skilled in the art. For example, one or both of bowl insert 30 and liner 35 can be a continuous concave bowl, have a series of connected or integrated side walls that preferably integrally connect with the base. Preferably, bowl insert 30 is made of aluminum but any metal or conductive material can be used. Additionally, bowl insert 30 can include a coating (not shown). Also preferably, bowl insert 30 is separate from and can be removed from housing 20 for cleaning and filling.

Partly or wholly positioned within housing assembly 15, bowl 10 includes a cooling system 40 for warming or cooling bowl insert 30. Cooling system 40 preferably includes one or more fans 50, one or more heat sinks 44, a conductive block 48, and a thermoelectric module 42, which has a first side 42*a* and a second side 42*b* as shown in FIGS. 18 and 13B. In the preferred embodiment, second side 42*b* of thermoelectric module 42 cools or chills bowl insert 30 when thermoelectric module second side 42*b* is positioned adjacent to, near, or otherwise thermally coupled to bowl insert 30. Cooling system 40 and specifically fan 50 and thermoelectric module 42 are preferably operationally controlled by control system 90, which is discussed further below.

In its preferred embodiment where temperature-controlled bowl 10 is configured to cool or chill the contents of bowl insert 30, thermoelectric module 42 is positioned within housing 20 below or near liner 35 and bowl insert 30. Second side 42*b* of thermoelectric module 42 is directed at or thermally coupled to liner 35 and/or to bowl insert 30 as shown in FIGS. 5, 17A, 17B, 19, and 24. As second side 42*b* of thermoelectric module 42 absorbs heat, it cools bowl insert 30, preferably via a thermal connection through conduction block 48 and liner 35. Conversely, first side 42*a* of thermoelectric module 42 radiates heat, which is preferably directed away from bowl insert 30 using heat sink 44 or multiple heat sinks and fan 50 or multiple fans.

Thermoelectric module 42 is preferably a Peltier module or a solid-state active heat pump which transfers heat from one side of the device to the other when energized. In the preferred embodiment, Peltier module is a 40 mm-by-40 mm thermoelectric cooling plate such as Model No. TEC1-12706 by Shenzhen HiLetgo Technology Co., Ltd of Guangdong, China. In some embodiments, multiple thermoelectric modules 42, 45 can be cascaded or staged together to improve the overall temperature change. Also optionally, for some embodiments of bowl 10, the polarity of thermoelectric module 42 optionally can be reversed so that its first side 42*a* absorbs heat when energized and its second side 42*b* radiates heat when energized thus allowing the bowl insert to be either cooled or heated.

FIGS. 5, 11, 13A, and 13B illustrate the preferred arrangement of components of cooling system 40. Specifically, and as shown in the figures, conduction block 48 is positioned in first sub-chamber 62*a* of housing 20 and in insulation opening 26*d* of insulation 26. Thermoelectric module 42 is then positioned in first partition opening 64*a* of first partition 64 of housing 20 immediately below conduction block 48, with the second side 42*b* of thermoelectric module 42 facing, touching, or coupled to conduction block 48. In second sub-chamber 62*b* of housing 20 and positioned immediately below thermoelectric module 42 such that it faces, touches, or is coupled to the first side 42*a* of thermoelectric module 42 preferably sits heat sink 44. Positioned immediately below heat sink 44 and above second partition opening 66*a* of second partition 66 sits fan 50, which is operationally oriented to draw air from the environment and into third sub-chamber 62*c* and to exhaust air from second sub-chamber 62*b* and to the environment. Although the preferred arrangement of cooling system 40 components is vertically stacked such that the bases of liner 35 or bowl insert 30 cooperate with cooling system 40, the components can be positioned adjacent to, and oriented on their side, to cooperate with the walls of liner 35 or bowl insert 30 or in other positions and orientations as long as the second side 42*b* of thermoelectric module 40 is thermally coupled to liner 35 or bowl insert 30.

As shown in the figures and discussed above, conduction block 48 is preferably positioned in housing 20 between liner 35 and thermoelectric module 42 such that it thermally connects second side 42*b* of thermoelectric module 42 with liner 35 and bowl insert 30. As is further discussed below with respect to housing assembly 15, conduction block 48 if preferably further positioned in a first housing sub-chamber 62*a* and within an opening 26*d* in insulation 26. In its preferred embodiment, conduction block 48 is made of aluminum or a material having high thermal conductivity such as an aluminum alloy, copper, an aluminum oxide ceramic, or an aluminum nitride and beryllium oxide ceramic. Conduction block 48 also is preferably connected to liner 35 and thermoelectric module 42 with a heat conducting or thermal paste or grease and optionally connected with fasteners. Conduction block 48 optionally also attaches to cooperating components of cooling system 40 with fasteners or with a press fit.

Figure 11:
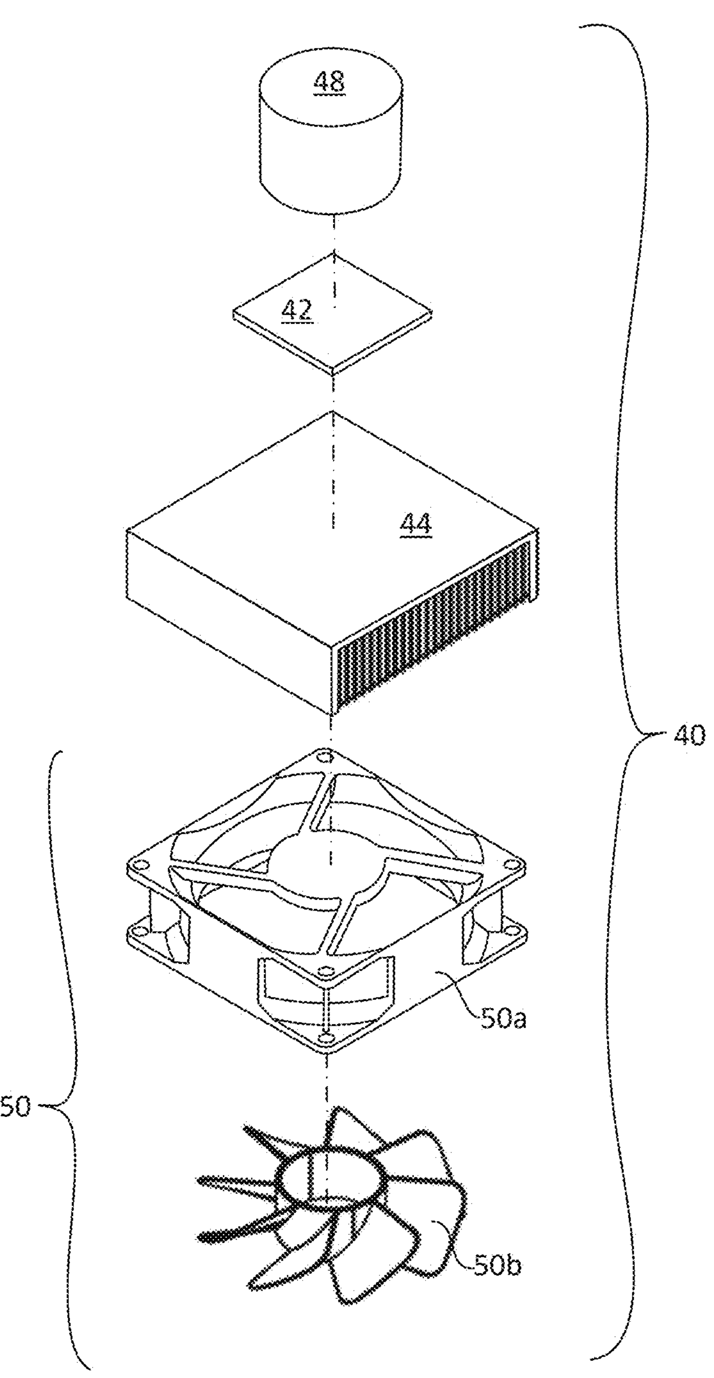
FIG. 11 is an exploded view of the components of the cooling system of temperature-controlled bowl of the present invention according to the preferred embodiment.
Figure 14:
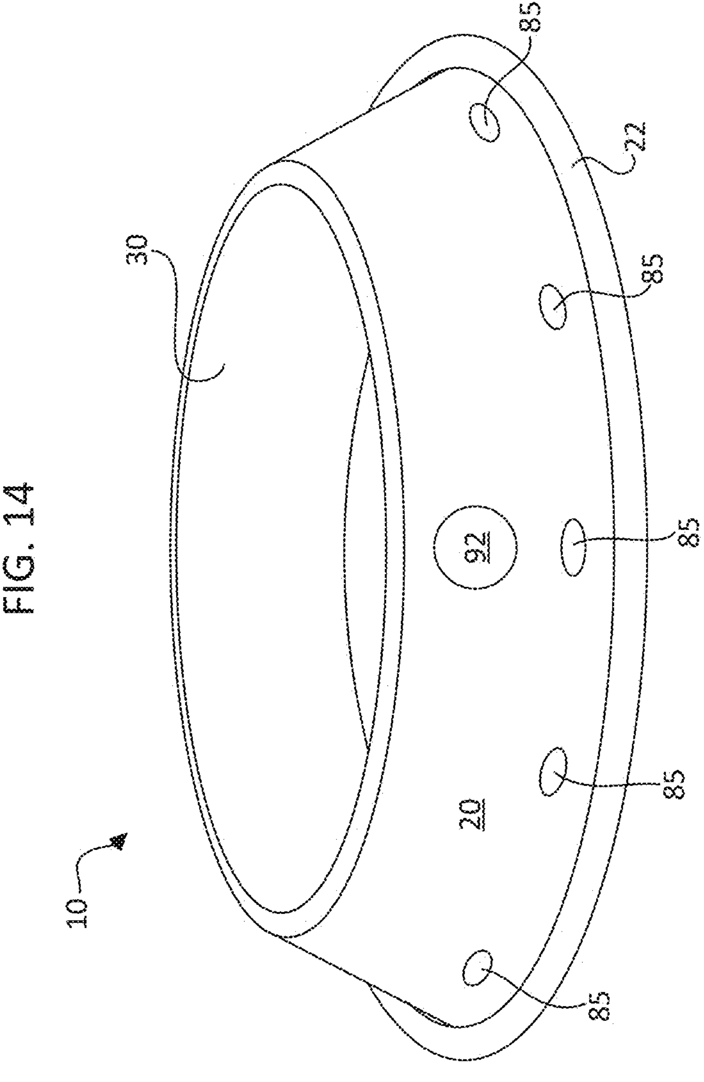
FIG. 14 is a perspective view of the temperature-controlled bowl of the present invention according to an alternative embodiment.
Figures 15, 16:
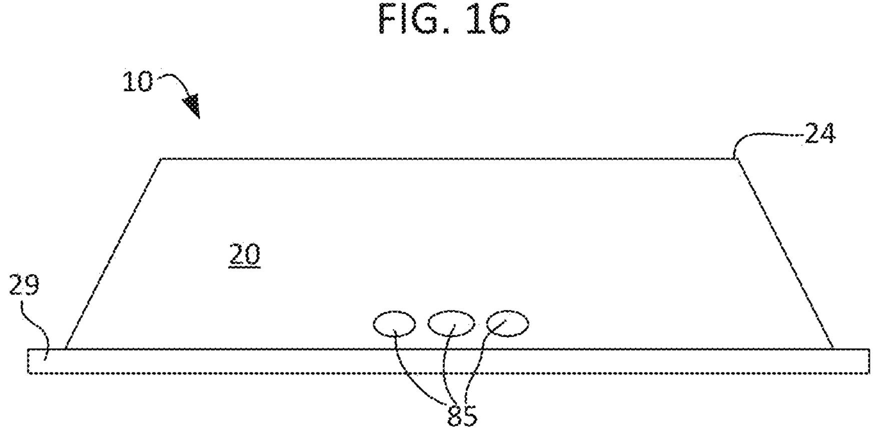
FIG. 15 is a top view of the temperature-controlled bowl of the present invention according to a second alternative embodiment.
FIG. 16 is a side view of the temperature-controlled bowl of the present invention according to the second alternative embodiment.

Heat sink 44 of cooling system 40 is preferably a finned heat sink as shown in FIGS. 11 and 13A that works well with a fan for forced convection and is preferably made of copper or aluminum. Optionally, a thermal interface material such as thermal grease or paste fills any gaps at the interface between a flat side of heat sink 44 and the first side 42*a* of thermoelectric module 42, ensuring better heat transfer and preventing air gaps that would reduce efficiency. Heat sink 44 is further preferably positioned below insulation 26 and such that it is isolated from first sub-chamber 62*a* of housing 20. Along with fan 50, heat sink 44 preferably is positioned entirely within second sub-chamber 62*b* of housing 20.

Fan 50 can be placed below heat sink 44 as shown in FIGS. 5 and 8 or adjacent to and near heat sink 44 as shown in FIGS. 4A and 4B. Optionally, multiple fans 50, 51 can be used. In the preferred embodiment, fan 50 is positioned immediately below heat sink 44 and within second sub-chamber 62*b* of housing 20. More preferably, fan 50 is preferably attached to second partition 66 of housing 20 with fasteners and positioned directly above the second partition opening 66*a* such that air must flow through fan 50 as it travels from third sub-chamber 62*c* of housing 20 to second sub-chamber 62*b*. Fan 50 is further positioned adjacent to or at a very small spaced distance from heat sink 44 such that fan 50 improves the efficiency of heat dissipation from heat sink 44 by drawing in cooler air from the third sub-chamber 62*c* of housing 20 and pushing away warm air through the second sub-chamber 62*b* of housing 20. Fan 50 preferably includes a fan housing 50*a* and a fan blade 50*b* and is in electrical communication with control system 90 such that it can be activated when thermoelectric module 42 is energized and operational. In the preferred embodiment, fan 50 attaches to housing 20 with fasteners and more preferably to housing second partition 66 with fasteners. Additionally fan 50 can attach to heat sink 44 with fasteners.

Control system 90 operates to control both fan 50 and thermoelectric module 42 as well as any additional optional features of bowl 10. Fan 50 and thermoelectric module 42 are preferably electrically connected to each other, any switches, and the power source via wired connections 93 and 96-99. Preferably, control system 90 includes a power switch 91, a temperature control switch 92, and one or more power receptacles 94*a*, 94*b*, all of which electrically communication with each other and fan 50 and thermoelectric module 42. Preferably, temperature control switch 92 is a rheostat switch or a switch that allows for selection between two cooling temperatures such as 50 degrees Fahrenheit and 60 degrees Fahrenheit. Optionally, temperature control switch 92 also acts as a power switch. Also optionally, a polarity reversal switch 95 can also be electrically connected to the power source, control system 90, and thermoelectric module 42 to reverse the polarity of thermoelectric module 42 to make its first side 42*a* absorb heat and its second side 42*b* radiate heat and thereby cause the temperature of bowl insert 30 to rise. In some embodiments, additional features may be present including a display 100 and one or more sensors 110, which are further in electrical communication with the other components of control system 90 through wired connections 99, 112.

To change the temperature of bowl insert 30, thermoelectric module 42 electrically connects to a power source either via a direct wire connection 93 or indirectly via wired connections 97, 98, 99, a switch 92, and/or a control system 90. Preferably, bowl 10 includes one or more power receptacles 94*a*, 94*b* configured to electrically connect the power source with the components of control system 90. More preferably, bowl 10 includes one receptacle for connecting to a power source where the power source is 120-230 Volts AC from a standard wall outlet. Optionally, bowl 10 includes a second receptacle for connecting to a second power source, where the power source is 12 Volts DC such as what is available when temperature-controlled bowl 10 is used in an automobile.

Optionally, control system 90 includes a computer system or controller 120 that operationally and electrically connects the power source to thermoelectric module 42, first fan 50, optional second fan 51, optional polarity reversal switch 95, an optional display 100 as mentioned above, and any other necessary or optional components of control system 90. Preferably, switch 92 and/or switch 91 is positioned between the power source and controller 120 or between the power source and thermoelectric module 42 when no controller 120 is present to selectively energize control system 90 and thermoelectric module 42. Where present, controller 120 houses together, includes, or electrically and operationally connects any necessary control and processing components such as a processor, memory, input and output components, wireless or wired communication components, sensors, or any other feature of a computer, controller, or control system as is well known in the art. Software can be stored on the controller's memory and is preferably executable by the processor to perform many tasks, including, for example, monitoring the temperature of bowl insert 30 using an optional temperature sensor 110 and adjusting the output of the thermoelectric module 42 accordingly. Control system 90 and controller 120 can also alert, automatically shut the power off, or otherwise control various bowl features through monitoring with additional sensors (not shown) factors such as the level of water in bowl insert 30 or other environmental or operational conditions.

Control system 90, including controller 120, is preferably at least partially housed by housing 20, and optional display 100 and inputs or switches 91, 92, 95 preferably are at least partially positioned on or in housing 20. Preferably, control system 90 components housed within housing 20 are positioned within second sub-chamber 62*b*, which keeps them elevated from the ground as shown in FIG. 5 thereby protecting them from any water that may spill from bowl insert 30. Optionally, control system 90 components can be placed in an isolated or watertight chamber or elevated from the ground through the use of feet, risers, or lower supports 28. Optional display 100 can be an LED-type display, LCD-type display, or other types of visual and audible indicators, and optional display 100 preferably electrically connects to the power source and controller 120 as shown in FIG. 5. Optional display 100 also operates as an additional user input, supplementing switches 91, 92, 95.

Additional embodiments of temperature-controlled bowl 10 may include features such as a filter 70, a fountain, 76, one or more hoses 72, 74 for establishing fluid communication between filter 70, fountain 76, and bowl insert 30, as shown in FIG. 8. With this embodiment, a fountain control system 78 and wired connection 79 can also connect with input and/or temperature control switch 92, display 100, controller 120, and the power source to activate and operate the filter and fountain features.

To use temperature-controlled bowl 10 as a chilled water bowl for pets, a pet owner or caregiver fills bowl insert 30 with water and, if insert 30 was removed from the housing, places the filled bowl insert 30 into the housing and in liner 35 where present. After bowl insert 30 has been filled with water, the pet owner or caregiver connects temperature-controlled bowl 10 to the power source and, where necessary, switches the power on. Using temperature switch 92 or optional display 100, the pet owner or caregiver can set a cooling temperature, cooling schedule, or other cooling features. According to the selected settings, thermoelectric module 42 operates to chill bowl insert 30. The temperature of bowl insert 30 is preferably monitored with a sensor 110, and once a desired temperature has been reached, thermoelectric module 42 operates intermittently to maintain the specified temperature. At any time while bowl insert 30 is present in the housing, a pet can approach temperature-controlled bowl 10 and drink from it. When bowl insert 30 is empty, optionally sensor 110 recognizes the absence of water and alerts the pet owner or caregiver. Temperature-controlled bowl 10 can then be disconnected from the power source for refilling.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

I claim:

1. A temperature-controlled bowl comprising:

a) a housing assembly comprising a housing having an upper surface and defining a chamber, a bowl insert supported by the housing, insulation positioned within the chamber of the housing and adjacent to the bowl insert, and a cap positioned between the upper surface of the housing and a rim of the bowl insert, wherein the housing comprises a wall defining a plurality of vents;

b) a cooling system positioned in the chamber of the housing, the cooling system comprising a heat sink, a thermoelectric module thermally coupled on a first side to the heat sink and thermally coupled on a second side to the bowl insert, and a fan positioned adjacent to the heat sink, wherein the fan is in fluid communication with the plurality of vents defined by the housing wall;

c) a control system comprising a switch in electrically communication with the thermoelectric module and the fan of the cooling system;

d) a conductive liner positioned between, and thermally coupled to, the bowl insert of the housing assembly and the second side of the thermoelectric module of the cooling system; and e) a conductive block positioned between, and thermally coupled to, the second side of the thermoelectric module of the cooling system and the conductive liner of the housing assembly.

2. The temperature-controlled bowl of claim 1 wherein the housing further defines first and second sub-chambers, the insulation of the housing assembly being positioned in the first sub-chamber of the housing, and the heat sink and fan of the cooling system being positioned in the second sub-chamber of the housing.

3. The temperature-controlled bowl of claim 2 wherein the housing further defines a third sub-chamber, the fan of the cooling system being in fluid communication with the third sub-chamber of the housing.

4. The temperature-controlled bowl of claim 3 wherein a first housing partition separates the first sub-chamber of the housing from the second sub-chamber of the housing, wherein a second housing partition separates the second sub-chamber of the housing from the third sub-chamber of the housing, wherein the thermoelectric module of the cooling system is positioned in an opening defined by the first housing partition, and wherein the fan is in fluid communication with the third sub-chamber of the housing through an opening defined by the second housing partition.

5. The temperature-controlled bowl of claim 4 wherein the housing assembly further comprises first and second pluralities of vents defined by the housing wall, wherein the first plurality of vents is in fluid communication with the second sub-chamber of the housing and the second plurality of vents is in fluid communication with the third sub-chamber of the housing.

6. The temperature-controlled bowl of claim 1 wherein the control system further comprises:

a) a controller in electrical communication with the thermoelectric module and the fan of the cooling system; and b) a sensor positioned in the first sub-chamber of the housing and adjacent to the conductive liner of the housing assembly, wherein the sensor is in electrical communication with the controller.

7. The temperature-controlled bowl of claim 1 wherein the bowl insert of the housing assembly is capable of being removed from the housing assembly.

8. The temperature-controlled bowl of claim 1 wherein the control system further controls a temperature selection switch.

9. The temperature-controlled bowl of claim 1 wherein the control system further comprises a polarity reversal switch in electrical communication with the thermoelectric module of the cooling assembly.

10. The temperature-controlled bowl of claim 1 wherein the cooling system comprises stacked first and second thermoelectric modules.

11. A temperature-controlled bowl comprising:

a) a housing assembly comprising:

i) a housing having an upper surface and defining a first sub-chamber, a second sub-chamber, and a third sub-chamber, wherein the housing comprises a first partition that separates the first sub-chamber from the second sub-chamber, a second partition that separates the second sub-chamber from the third sub-chamber, and a perimeter wall that defines a plurality of exhaust vents in fluid communication with the second sub-chamber and a plurality of intake vents in fluid communication with the third sub-chamber;

ii) a conductive liner supported by the housing, the conductive liner comprising a liner wall connected to a liner base, wherein the conductive liner is positioned in the first sub-chamber of the housing;

iii) insulation positioned within the first sub-chamber of the housing, wherein the insulation comprises an insulation wall that surrounds an outer perimeter of the liner wall of the conductive liner and an insulation base that sits adjacent to the liner base of the conductive liner, the insulation base defining a insulation opening;

iv) a bowl insert configured to sit at least partly on the conductive liner; and v) a cap positioned between the upper surface of the housing and a rim of the bowl insert, b) a cooling system positioned in the first and second sub-chambers of the housing, the cooling system comprising:

i) a conduction block positioned in the insulation opening of the insulation of the housing assembly, wherein the conduction block is thermally coupled to the conductive liner of the housing assembly;

ii) a heat sink positioned in the second sub-chamber of the housing assembly housing;

iii) a thermoelectric module positioned in a first partition opening defined by the first partition of the housing assembly housing, wherein the thermoelectric module is thermally coupled on a first side to the heat sink and on a second side to the conduction block; and iv) a fan positioned in the second sub-chamber of the housing assembly housing adjacent to the heat sink, wherein the fan is in fluid communication with the plurality of exhaust vents defined by the housing wall of the housing assembly housing and the third sub-chamber through a second partition opening defined by the second partition of the housing assembly housing; and c) a control system comprising a switch in electrical communication with the thermoelectric module and the fan of the cooling system to the power source.

12. The temperature-controlled bowl of claim 11 wherein the control system further comprises:

a) a controller in electrical communication with the thermoelectric module and the fan of the cooling system; and b) a sensor positioned in the first sub-chamber of the housing and adjacent to the conductive liner of the housing assembly, wherein the sensor is in electrical communication with the controller.

13. The temperature-controlled bowl of claim 11 wherein the bowl insert of the housing assembly is capable of being removed from the housing assembly.

14. The temperature-controlled bowl of claim 11 wherein the control system further comprises a polarity reversal switch in electrical communication with the thermoelectric module of the cooling assembly.

15. The temperature-controlled bowl of claim 11 wherein the cooling system comprises stacked first and second thermoelectric modules.

16. The temperature-controlled bowl of claim 11 wherein the cooling system comprises a plurality of fans positioned adjacent to the heat sink.

* * * * *